United States Patent
Stammers et al.

(10) Patent No.: US 11,924,752 B2
(45) Date of Patent: Mar. 5, 2024

(54) DEVICE ONBOARDING USING CELLULAR DATA SERVICES DIRECTORY

(71) Applicant: Cisco Technology, Inc., San Jose, CA (US)

(72) Inventors: Timothy Peter Stammers, Raleigh, NC (US); Patrick Jean Marc Grossetete, Marcoussis (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 104 days.

(21) Appl. No.: 17/371,812

(22) Filed: Jul. 9, 2021

(65) Prior Publication Data
US 2023/0012340 A1    Jan. 12, 2023

(51) Int. Cl.
H04W 24/02 (2009.01)
H04W 48/16 (2009.01)
H04W 48/20 (2009.01)

(52) U.S. Cl.
CPC .......... *H04W 48/20* (2013.01); *H04W 48/16* (2013.01)

(58) Field of Classification Search
CPC .............................. H04W 48/20; H04W 48/16
See application file for complete search history.

(56) References Cited

U.S. PATENT DOCUMENTS

| 10,833,938 B1 | 11/2020 | Rajput et al. | |
| 2013/0051231 A1* | 2/2013 | Cai | H04W 28/22 370/230 |
| 2016/0080578 A1 | 3/2016 | Stenfelt et al. | |
| 2019/0053291 A1 | 2/2019 | Mukherjee et al. | |
| 2019/0110154 A1 | 4/2019 | Jantzi et al. | |
| 2019/0357119 A1* | 11/2019 | Hong | H04W 48/02 |
| 2020/0396298 A1* | 12/2020 | Livanos | H04L 41/0894 |
| 2021/0105196 A1* | 4/2021 | Dao | H04L 43/026 |

OTHER PUBLICATIONS

APN.How, "What is APN?", APN Settings, https://apn.how/, downloaded Jul. 9, 2021, 2 pages.

(Continued)

*Primary Examiner* — Said M Elnoubi
(74) *Attorney, Agent, or Firm* — Edell, Shapiro & Finnan, LLC

(57) ABSTRACT

An approach to automatically provision a data service name (APN or DNN) when an endpoint device connects to a mobile network is described. A methodology includes receiving from an endpoint device a first request to connect to a mobile network, the first request including an identifier of the endpoint device and a default data service name, responsive to detecting the default data service name, determining, from the identifier of the endpoint device, a group to which the endpoint device belongs along with a corresponding group identifier for the group, querying a repository with the group identifier, and receiving, in response, an assigned data service name that is associated with the group identifier, providing the assigned data service name to the endpoint device, and receiving from the endpoint device a second request to connect to the mobile network, the second request including the assigned data service name.

19 Claims, 5 Drawing Sheets

(56) References Cited

OTHER PUBLICATIONS

HW Group, "International APN Settings for Mobile Broadband Network Operators", https://www.hw-group.com/support/international-apn-settings-for-mobile-broadband-network-operators, downloaded Jul. 9, 2021, 17 pages.
Palisis, "Mobile Carriers and APN settings", Palisis Support Center, https://support.palisis.com/hc/en-us/articles/213822563-Mobile-Carriers-and-APN-settings, downloaded Jul. 9, 2021, 15 pages.
Cradlepoint, "Common Access Point Names (APN) by Carrier", https://customer.cradlepoint.com/s/article/access-point-names-by-carrier, Oct. 5, 2015, 4 pages.

* cited by examiner

DEVICE ONBOARDING USING CELLULAR DATA SERVICES DIRECTORY

TECHNICAL FIELD

The present disclosure relates to automatically configuring an endpoint device with a data service network name so that the endpoint device can communicate with a corresponding data service network.

BACKGROUND

Fourth generation (4G) Long Term Evolution (LTE) mobile network architecture provides an Internet Protocol (IP) data pipe primarily designed for the delivery of voice, video, and other multimedia services, and includes secondary provisions for supporting machine-to-machine (M2M) and Internet-of-Things (IoT) applications.

Fifth generation (5G) network architecture, in contrast, is designed so that it can be optimized for a range of use cases. To this end, the 5G network architecture implements a feature called network "slicing," which enables network providers to define and create virtual end-to-end network connections with clearly defined channel capacities, quality of service (QoS) parameters, priority levels, and security requirements that are tailored to application requirements and user equipment (UE) capabilities. Given the flexibility of network slicing, applications running over a 5G network can range from sub-kbit/s, high-latency data streams used to read utility meters and manage streetlights in smart cities, to ultra-reliable low latency communication services that provide connectivity for critical applications such as autonomous vehicles, factory automation systems, and tele-surgery robots.

In both the 4G and 5G cases, endpoint devices, e.g., routers, IoT gateways, etc., are on-boarded to a given mobile (i.e., service provider) network. A UE, e.g., a mobile phone or an IoT device, may thereafter connect to the mobile network via the endpoint device. In many cases, the mobile network is merely a conduit for the communication desired by the endpoint device or UE. In this regard, both the endpoint device and the UE may be configured to access a data service network that is in communication with the mobile network and which is identified by a "data service name." The data service name is a construct that is part of the mobile cellular network and is configured in the mobile network. It has attributes that affect both behavior in the mobile network and the way that mobile network connects to external data networks and services. In a 4G network, the data service name is referred to as an access point name (APN), and in a 5G network the data service name is referred to as a data network name (DNN). An APN or DNN is stored in the endpoint device (and in the UE), and is provided, along with other parameters, to the mobile network during a connection request.

DESCRIPTION OF EXAMPLE EMBODIMENTS

Overview

Figure 1:
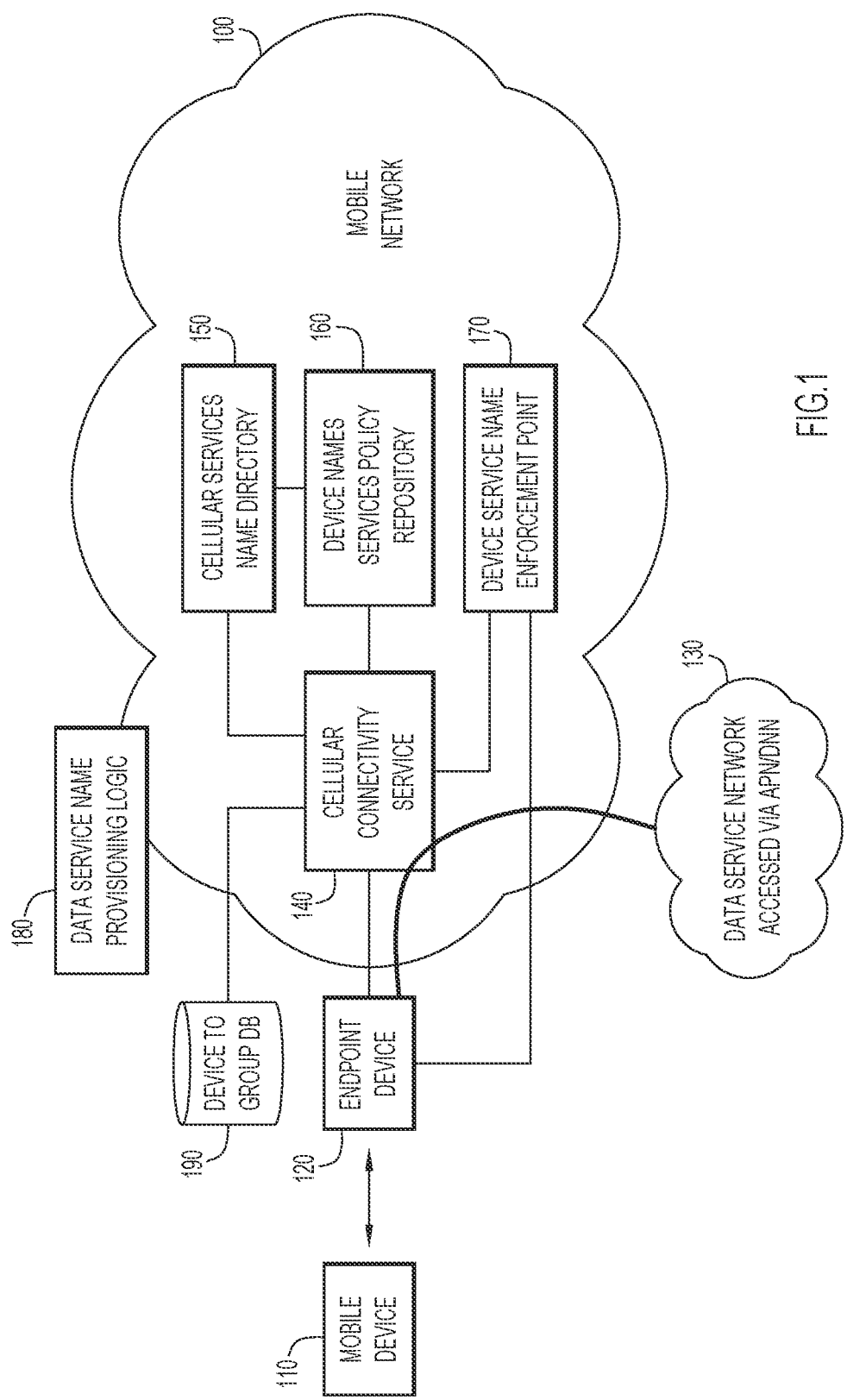
FIG. 1 shows a system including a mobile network, cellular services name directory, and data service name provisioning logic, according to an example embodiment.

Presented herein is a method to automatically provision a data service name (APN or DNN) when an endpoint device connects to a mobile network. The method includes receiving from an endpoint device a first request to connect to a mobile network, the first request including an identifier of the endpoint device and a default data service name, responsive to detecting the default data service name, determining, from the identifier of the endpoint device, a group to which the endpoint device belongs along with a corresponding group identifier for the group, querying a repository with the group identifier, and receiving, in response, an assigned data service name that is associated with the group identifier, providing the assigned data service name to the endpoint device, and receiving from the endpoint device a second request to connect to the mobile network, the second request including the assigned data service name.

In another embodiment, a device is provided. The device includes an interface configured to enable network communications, a memory, and one or more processors coupled to the interface and the memory, and configured to: receive from an endpoint device a first request to connect to a mobile network, the first request including an identifier of the endpoint device and a default data service name, responsive to detecting the default data service name, determine, from the identifier of the endpoint device, a group to which the endpoint device belongs along with a corresponding group identifier for the group, query a repository with the group identifier, and receive, in response, an assigned data service name that is associated with the group identifier, provide the assigned data service name to the endpoint device, and receive from the endpoint device a second request to connect to the mobile network, the second request including the assigned data service name.

Example Embodiments

A mobile network maintains a list of deployed data service names corresponding to respective data service networks. As noted, in a 4G network, the data service name is referred to as an access point name (APN), and in a 5G network the data service name is referred to as a data network name (DNN). Some of the data service names are globally agreed upon via, e.g., GSMA, for service continuation while roaming. Examples of such agreed upon data service names include, e.g., "IMS" and "SOS." Other data service names are assigned to millions of devices served by a service provider. Such data service names include, e.g. "Broadband," "Consumer," "Data," or "IoT." Still other data service names are specific to an enterprise, e.g., Company-X, Company-Y, Utilities, Transportations, etc., for which a service provider provides service.

When an endpoint device, such as an Internet Protocol (IP) router or IoT gateway (GW), is deployed and powered on, it must be configured with an appropriate data service name (APN or DNN) so that the endpoint device can access a desired data service or data service network. That configuration is typically a manual process and, as such, is difficult to scale when, e.g., hundreds or even thousands of endpoint devices are deployed in a short period of time.

At the same time, the number and scale of data service names that a given mobile network might support and provision may be limited for several reasons. For example, there may be uncertainty related to the accuracy of gathering knowledge of provisioned data service names, there is overhead related to managing the number of data service names, there is significant cost associated with, e.g., booting up an endpoint device and configuring a data service name for the same and potentially repeating that process thousands of times, there is complexity associated with deploying the data service names to the network, and there may be fear of incorrectly assigning data service name to endpoint devices.

To achieve desired scaling and accuracy of data service name provisioning, embodiments described herein provide a comprehensive repository or directory of available data service names (i.e., APNs, DNNs) that is made available to mobile networks and their customers. Such a directory addresses the uncertainties noted above, and, as will be explained below, enables an automated policy-driven process to manage, deploy and monitor data service names as well as endpoint device assignment to a given data service name based on group membership.

Reference is now made to the figures, beginning with FIG. 1, which shows, among other elements, a system including a mobile network 100, cellular services name directory 150, and data service name provisioning logic 180, according to an example embodiment. FIG. 1 also shows a mobile device 110 (i.e., a UE) that may communicate with an endpoint device 120, such as an IP router or IoT gateway, and, through a cellular connectivity service 140 of mobile network 100, mobile device 110 may communicate with a data service network 130 via a designated APN or DNN. Those skilled in the art will appreciate that the description herein is focused on provisioning a data service name to an endpoint device 120, but the embodiments described herein may also be applied to provision a data service name for mobile device 110.

In accordance with an embodiment, the designated or assigned APN and DNN may be provisioned to the endpoint device 120 by use of a cellular services name directory 150, device name services policy repository 160, device service name enforcement point 170, and device to group database (DB) 190, all of which may be under the control of data service name provisioning logic 180. More specifically, and as will be described more thoroughly with respect to FIG. 2 and FIG. 3, data service name provisioning logic 180 is configured to collect and aggregate data service names in various ways to populate cellular services name directory 150. Data service name provisioning logic 180 is also configured to map particular endpoint devices to predetermined groups (and to a corresponding group identifier) and to store that information in device to group database 190.

When a given endpoint device 120 attempts to connect to mobile network 100, endpoint device 120 is configured to include in its connection request a "default" data service name (i.e., a default APN or DNN). When cellular connectivity service 140 of mobile network 100 detects the default data service name, data service name provisioning logic 180 triggers selected processing by which a group identifier associated with the endpoint device 120 is used to look up a corresponding assigned data service name (APN or DNN) in device name services policy repository 160, which is updated by cellular services name directory 150 with list of data service names. Cellular connectivity service 140 may then cause device service name enforcement point 170 to communicate the assigned data service name (APN or DNN) to endpoint device 120, which in turn makes a second or renewed connection request to cellular connectivity service 140 using the assigned APN or DNN. In this way, endpoint device 120 is automatically (i.e., with zero touch) connected to the desired data service network 130 without having to manually configure the endpoint device 120 with an APN or DNN. The APN or DNN is automatically provisioned.

Figure 2:
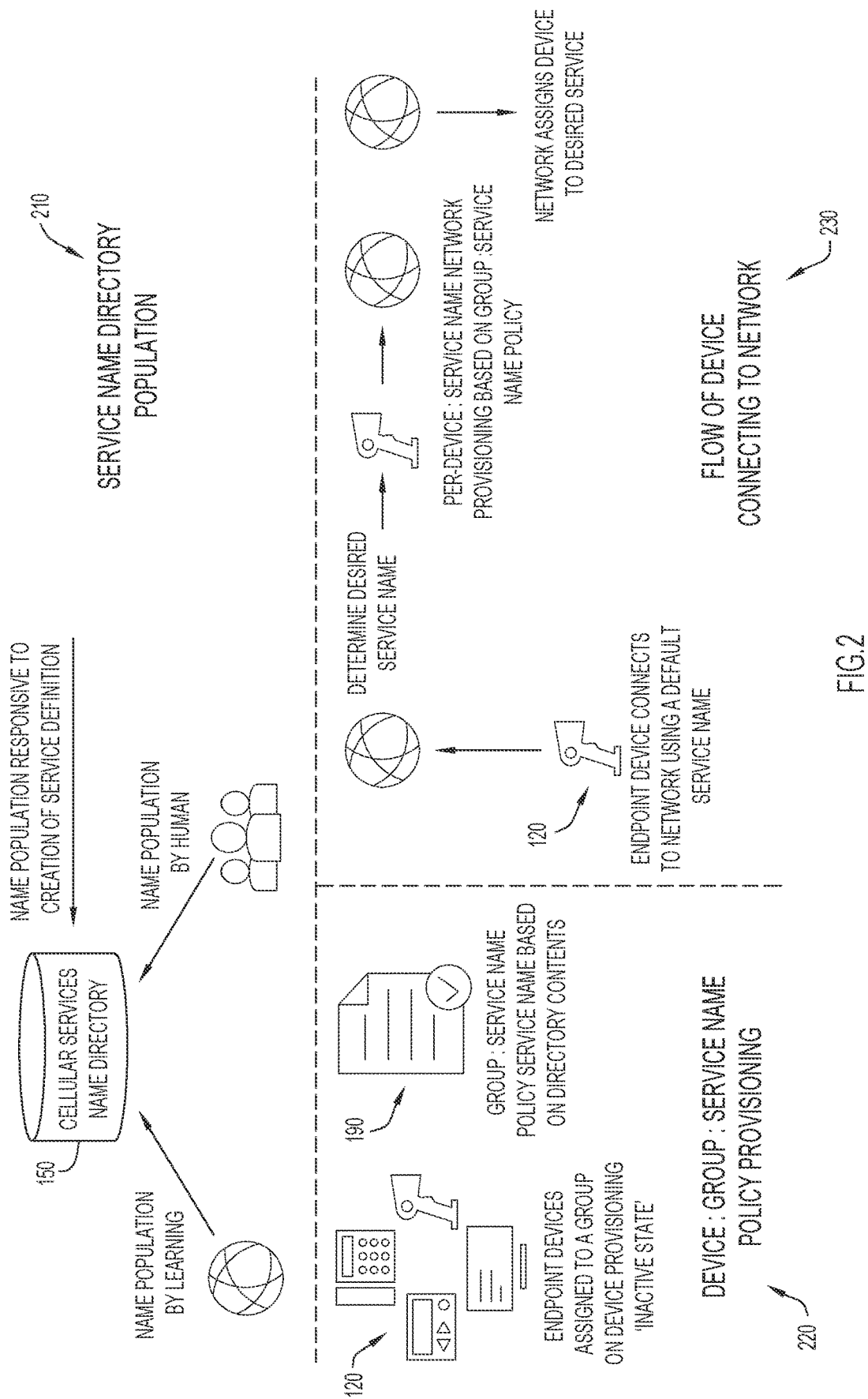
FIG. 2 is a high-level diagram depicting ways in which the cellular services name directory may be populated, and how the data stored therein may be leveraged to enable an endpoint device to connect to a mobile network, according to an example embodiment.

FIG. 2 is a high-level diagram depicting ways in which the cellular services name directory 150 may be populated, and how the data stored therein may be leveraged to enable endpoint device 120 to connect to data service network 130, according to an example embodiment.

Reference numeral 210 represents possible operations of populating cellular services name directory 150. In an embodiment, and as shown in FIG. 2, data service network names may be populated manually by a human, by data service name provisioning logic 180 learning of APNs, DNNs, and/or by an automatic feed as a result of creating a service definition (e.g., a newly-defined 5G network slice). The automatic feed may include a case where a separate system defines services of a network, and the data service name is one parameter that is defined. This separate system then, in coordination with data service name provisioning logic 180, programmatically populates the cellular services name directory 150 as that service is built, at deployment time, or at activation time of that service. The data service name may likewise be removed when the service is suspended or terminated. Notably, in many cases, the data service names that are populated into cellular services name directory 150 are non-public (i.e., the data service names are not those widely known such as "IMS" or "SOS"). Once populated, cellular services name directory 150 may function as a reference service for APNs or DNNs used in automated policy-driven device on-boarding, as described more fully below.

As those skilled in the art will appreciate, the cellular services name directory 150 leverages multiple sources to build a structured directory of the data service names. The structured aspect of cellular services name directory 150 consolidates each of the foregoing collection techniques and presents the ability to discover data service names in a way that is common across networks. This approach enables a provisioning system to adopt a single representation of the data service name, fetch the same from a definitive trusted source (the cellular services name directory 150), and then use one or more network specific provisioning connectors to apply that data service name throughout a network. The availability of a directory such as cellular services name directory 150 is particularly beneficial in view of the emergence of private LTE/private 5G networks that are not necessarily managed by traditional services providers.

Reference numeral 220 represents possible operations prior to endpoint device 120 onboarding. In their inactive state, endpoint devices may be assigned to groups and each group may be assigned a group identifier. Group assignment may be based on a service name policy (e.g., whether the endpoint device is an IP router, or an IoT GW). With such a group assignment, when a SIM card is inserted into endpoint device 120, and as will be described more fully below, there is no longer a need to manually configure an APN or DNN on a per device basis. Rather, the APN or DNN is automatically determined based on the group identifier and thereafter supplied to the endpoint device 120. In an embodiment, the endpoint device 120 may be identified by a mobile country code (MCC)+mobile network code (MNC) or integrated circuit card identification (ICCID) number stored on the SIM card. A short message service (SMS) exchange could also be added to ensure security of the automated process.

In an embodiment, assigning devices to groups could be a manual process based on a list of device IDs and their capabilities. Group assignment could also be based on scanning a code that represents the endpoint device that results in assignment to a group by a backend system. Group assignment could also be based on a manufacturer usage description (MUD).

Reference numeral 230 represents possible operations as endpoint device 120 attempts to connect to mobile network 100. As indicated, endpoint device 120 makes a connection request to mobile network 100 using a default data service name (APN or DNN). An assigned data service name is then determined for the endpoint device 120 by using a group identifier corresponding to the endpoint device 120 to look up an associated data service name, which is then used to ensure that the endpoint device 120 is assigned to the desired service.

Figure 3:
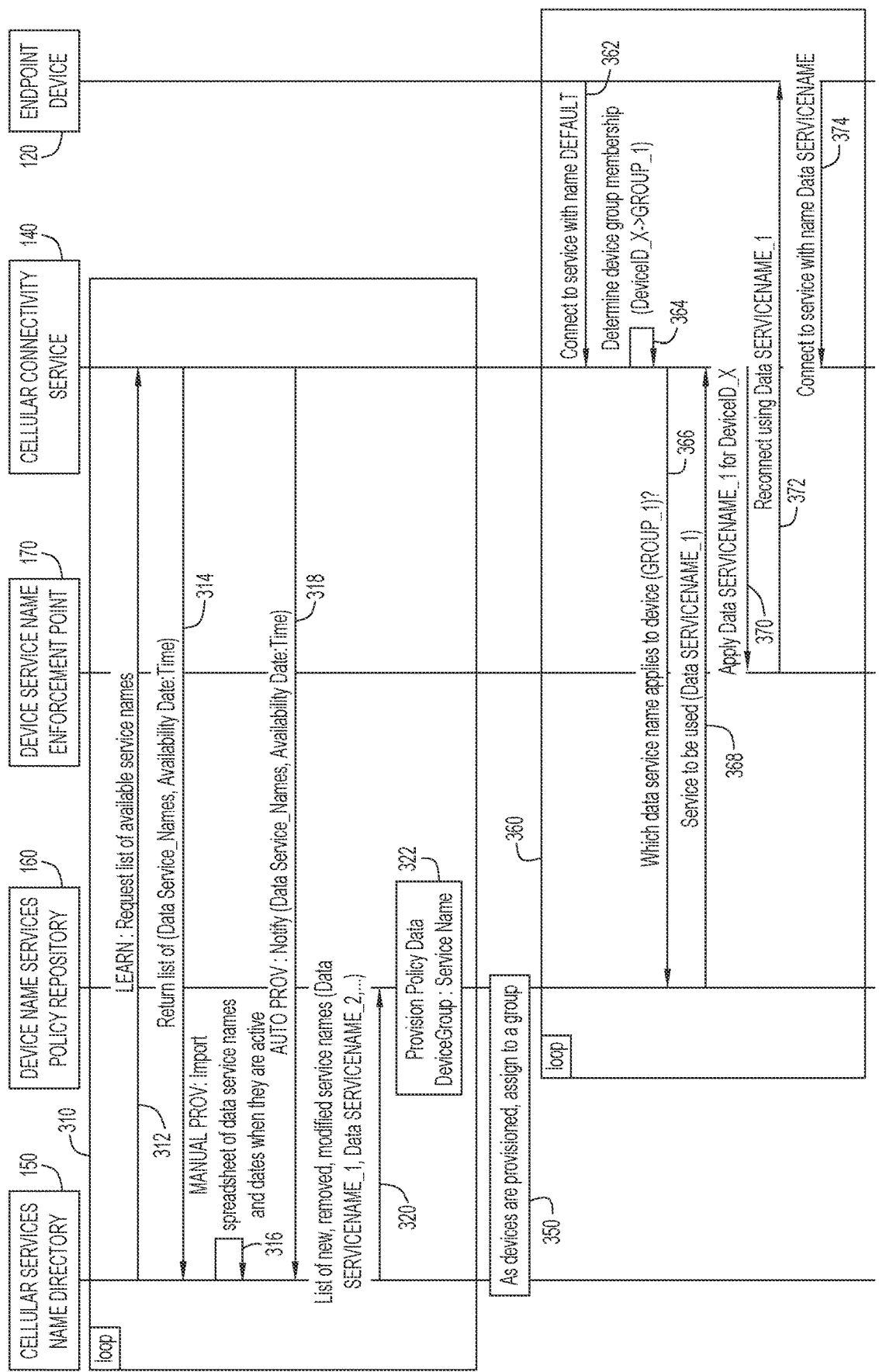
FIG. 3 shows a ladder diagram illustrating interactions among the several components of FIG. 1 to achieve zero touch provisioning of a data service name for an endpoint device, according to an example embodiment.

FIG. 3 shows a ladder diagram illustrating interactions among the several components of FIG. 1 to achieve zero touch provisioning of a data service name for endpoint device 120, according to an example embodiment. As shown in the figure, a loop 310 is provided that is configured to populate cellular services name directory 150. More specifically, at 312, cellular services name directory 150, in coordination with data service name provisioning logic 180, sends a learn request to cellular connectivity service 140 to obtain a list of data service names that may be available. At 314, cellular connectivity service 140 returns a list of data service names along with date and time availability information for those data service names. At the same time, at 316, and still within loop 310, data service names may be manually provisioned or populated into cellular services name directory 150, along the data and times such data service names are active. This information may be provided via appropriate spreadsheets and the like.

At 318, and in an automated provisioning fashion, cellular connectivity service 140 may also automatically notify cellular services name directory 150 of data service names along with their corresponding date and time availabilities. This automated provisioning or feed of data service names may be a result of, e.g., mobile network 100 configuring a new 5G network slice that includes a designated APN or DNN.

With these multiple ways of populating cellular services name directory 150 it is possible to collect and maintain a comprehensive list of data service names that can be leveraged by multiple mobile networks as the list may function as an authoritative source for data service names. At 320, the data service names (SERVICENAME_1, SERVICE-NAME_2, etc.) in the cellular services name directory 150 are provided to device name services policy repository 160 that is configured to interact directly with cellular connectivity service 140 during an on-boarding process.

At 322, respective data service names are associated with appropriate groups according to a provisioning policy. This operation may be performed at any time prior to the endpoint device 120 being on-boarded. In an embodiment, data service name provisioning logic 180 may be configured to control device name services policy repository 160 to fetch available data service names from the cellular services name directory 150 and thereafter make the associations to appropriate groups. Tying or associating a data service name to a group may be manual. Alternatively, or additionally, there are cases where the data service name might include, implicitly, a notion of a group, e.g., "IndustrRobot" or CompanyX or FleetCo_AssetTrack, to which it should belong. In such cases, device name services policy repository 160 may suggest matches of device group(s) to data service names and seek manual confirmation, or simply make the decision regarding assignment.

At 350, as endpoint devices are provisioned, they are assigned to a group.

A loop 360 is further shown in FIG. 3. Loop 360 represents how the data service names that have been collected and associated with groups is leverage to onboard endpoint device 120. At 362, endpoint device 120 makes a connection request for service with a default data service name. At 364, and responsive to the detecting the default data service name, cellular connectivity service 140 determines to which group the endpoint device belongs (i.e., DeviceID_X→GROUP_1). In an embodiment, a file from device to group DB 190 comprising a device:group map may be provided, periodically, to cellular connectivity service 140.

At 366, cellular connectivity service 140 sends a query, including the group identifier, to device name services policy repository 160 seeking the data service name for the endpoint device 120. In response, at 368, device name services policy repository 160 returns an assigned data service name (APN or DNN) associated with the indicated group (and to be used by endpoint device 120).

With the assigned data service name received at 368, cellular connectivity service 140 requests, at 370, that device service name enforcement point 170 apply the assigned data service name to endpoint device 120. Assuming the assigned data service name is valid, device service name enforcement point 170, at 372, sends a message to endpoint device 120 to make a renewed or second request to connect to cellular connectivity service 140 including the assigned data service name provided by device name services policy repository 160. At 374, endpoint device 120 makes a request for a service connection using, among other parameters, the assigned data service name (APN or DNN) provided by device service name enforcement point 170. In this way, endpoint device 120 mat be configured with a desired APN or DNN without having to be manually configured. The entire process of provisioning the APN or DNN is thus automatic and zero touch.

Figure 4:
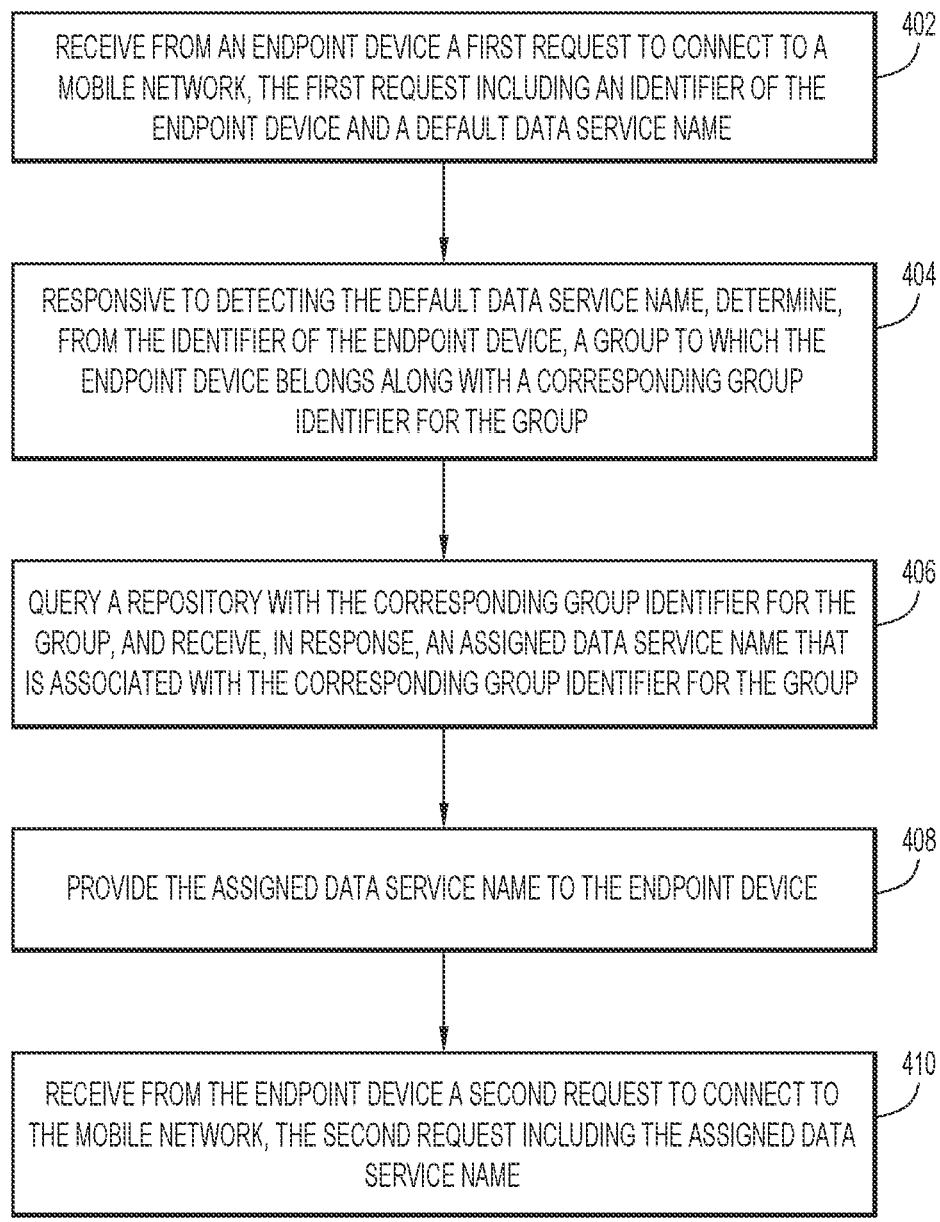
FIG. 4 is a flowchart showing a series of operations for provisioning a data service name for an endpoint device, according to an example embodiment.

FIG. 4 is a flowchart showing a series of operations for provisioning a data service name for an endpoint device, according to an example embodiment. At 402, an operation receives from an endpoint device a first request to connect to a mobile network, the first request including an identifier of the endpoint device and a default data service name. At 404, an operation, responsive to detecting the default data service name, determines, from the identifier of the endpoint device, a group to which the endpoint device belongs along with a corresponding group identifier for the group. At 406, an operation queries a repository with the corresponding group identifier for the group, and receives, in response, an assigned data service name that is associated with the corresponding group identifier for the group. At 408, an operation provides the assigned data service name to the endpoint device. And, at 410, an operation receives from the endpoint device a second request to connect to the mobile network, the second request including the assigned data service name.

As those skilled in the art will appreciate based on the foregoing disclosure, embodiments enable consolidation of several sources of data service names to a single structured directory. Such a single structured directory further facilitates a capability of an endpoint device that on-boards to a cellular connectivity network to automatically be provisioned a data service name (APN or DNN). This removes the manual provisioning step, which is a significant source of error and cost.

Figure 5:
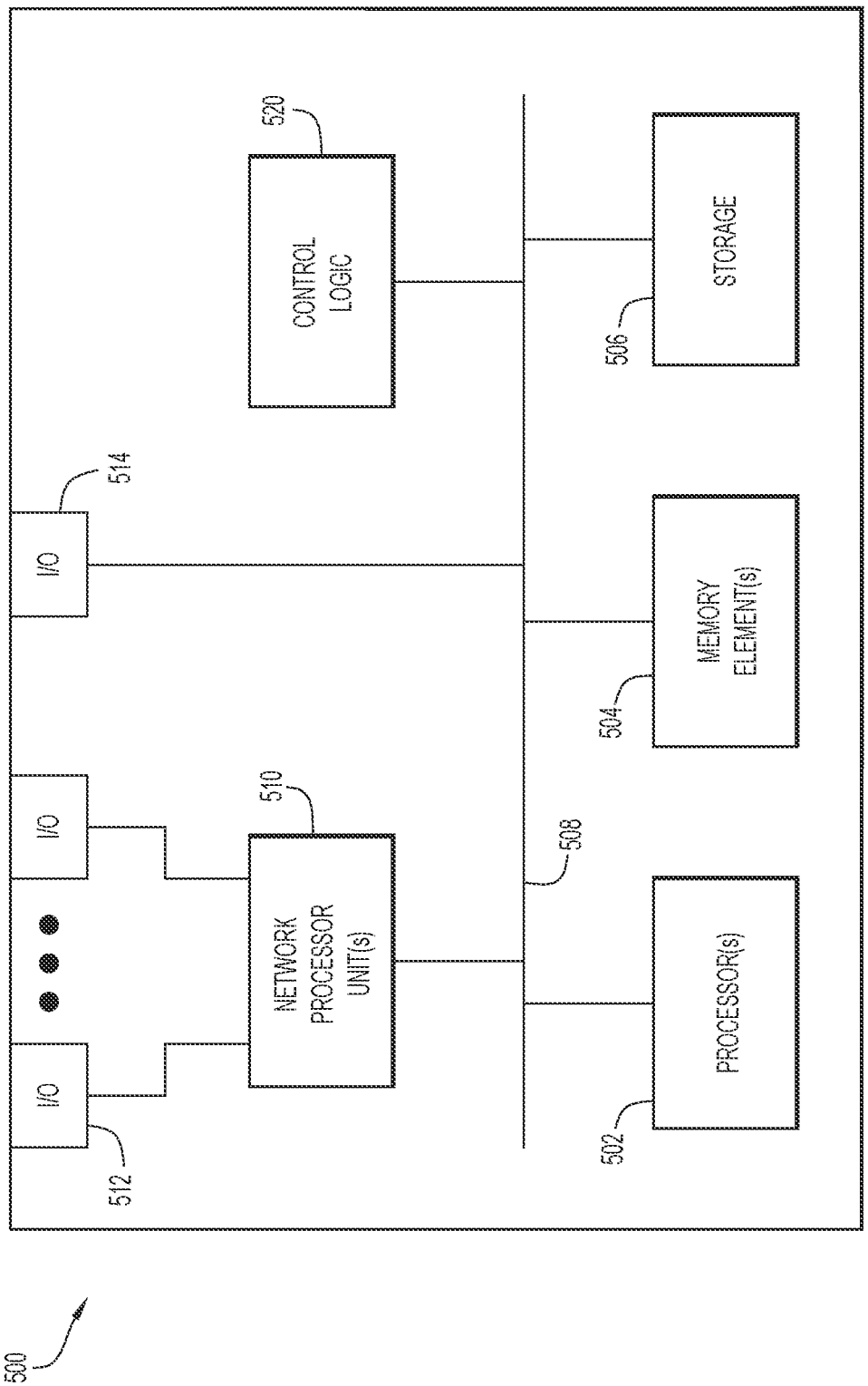
FIG. 5 illustrates a hardware block diagram of a computing device that may be configured to execute data service name provisioning logic, according to an example embodiment.

FIG. 5 illustrates a hardware block diagram of a computing device that may be configured to execute data service name provisioning logic 180, according to an example embodiment.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., data service name provisioning logic 180) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., data service name provisioning logic 180) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

In sum, a method is provided and includes receiving from an endpoint device a first request to connect to a mobile network, the first request including an identifier of the endpoint device and a default data service name, responsive to detecting the default data service name, determining, from the identifier of the endpoint device, a group to which the endpoint device belongs along with a corresponding group identifier for the group, querying a repository with the corresponding group identifier for the group, and receiving, in response, an assigned data service name that associated with the corresponding group identifier for the group, providing the assigned data service name to the endpoint device, and receiving from the endpoint device a second request to connect to the mobile network, the second request including the assigned data service name.

In an embodiment, the assigned data service name is one of an access point name (APN) or a data network name (DNN).

The method may further include populating a directory of a plurality of data service names, wherein the assigned data service name is among the plurality of data service names.

The method may include manually populating the directory of the plurality of data service names, populating the directory of the plurality of data service names based on information supplied by a service provider that operates the mobile network, and/or populating the directory of the plurality of data service names based on information automatically received as a result of creating a new service definition. The new service definition defines a network slice in a fifth generation (5G) wireless network The method may further include storing a mapping between the plurality of data service names and respective groups in the repository.

The endpoint device may be at least one of a router, a gateway, or user equipment (UE).

The method may also include assigning the endpoint device to the group during an inactive state of the endpoint device.

In another embodiment, a device is provided. The device includes an interface configured to enable network communications, a memory, and one or more processors coupled to the interface unit and the memory, and configured to: receive from an endpoint device a first request to connect to a mobile network, the first request including an identifier of the endpoint device and a default data service name, responsive to detecting the default data service name, determine, from the identifier of the endpoint device, a group to which the endpoint device belongs along with a corresponding group identifier for the group, query a repository with the corresponding group identifier for the group, and receive, in response, an assigned data service name that is associated with the corresponding group identifier for the group, provide the assigned data service name to the endpoint device, and receive from the endpoint device a second request to connect to the mobile network, the second request including the assigned data service name.

In an embodiment, the assigned data service name is one of an access point name (APN) or a data network name (DNN).

In an embodiment, the one or more processors may be configured to populate a directory of a plurality of data service names, wherein the assigned data service name is among the plurality of data service names, to enable manually populating the directory of the plurality of data service names, to populate the directory of the plurality of data service names based on information supplied by a service provider that operates the mobile network, and/or to populate the directory of the plurality of data service names based on information automatically received as a result of creating a new service definition. The new service definition defines a network slice in a fifth generation (5G) wireless network.

In still another embodiment, a non-transitory computer readable storage media encoded with instructions is provided. When executed by a processor, the instructions cause the processor to: receive from an endpoint device a first request to connect to a mobile network, the first request including an identifier of the endpoint device and a default data service name, responsive to detecting the default data service name, determine, from the identifier of the endpoint device, a group to which the endpoint device belongs along with a corresponding group identifier for the group, query a repository with the corresponding group identifier for the group, and receive, in response, an assigned data service name that is associated with the corresponding group identifier for the group, provide the assigned data service name to the endpoint device, and receive from the endpoint device a second request to connect to the mobile network, the second request including the assigned data service name.

In an embodiment, the assigned data service name is one of an access point name (APN) or a data network name (DNN).

In an embodiment, the instructions may cause the processor to populate a directory of a plurality of data service names, wherein the assigned data service name is among the plurality of data service names.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving from a gateway device a first request to connect to a mobile network, the first request including an identifier of the gateway device and a default data service name, wherein the gateway device is configured to enable a mobile device to communicate with a cellular connectivity service of the mobile network;
responsive to detecting the default data service name, determining, from the identifier of the gateway device, a group to which the gateway device belongs along with a corresponding group identifier for the group;
querying a repository with the corresponding group identifier for the group, and receiving, in response, an assigned data service name that is associated with the corresponding group identifier for the group;
providing the assigned data service name to the gateway device; and
receiving from the gateway device a second request to connect to the mobile network, the second request including the assigned data service name.

2. The method of claim 1, wherein the assigned data service name is one of an access point name (APN) or a data network name (DNN).

3. The method of claim 1, further comprising populating a directory of a plurality of data service names, wherein the assigned data service name is among the plurality of data service names.

4. The method of claim 3, further comprising manually populating the directory of the plurality of data service names.

5. The method of claim 3, further comprising populating the directory of the plurality of data service names based on information supplied by a service provider that operates the mobile network.

6. The method of claim 3, further comprising populating the directory of the plurality of data service names based on information automatically received as a result of creating a new service definition.

7. The method of claim 6, wherein the new service definition defines a network slice in a fifth generation (5G) wireless network.

8. The method of claim 3, further comprising storing a mapping between the plurality of data service names and respective groups in the repository.

9. The method of claim 1, further comprising assigning the gateway device to the group during an inactive state of the gateway device.

10. A device comprising:
an interface configured to enable network communications;
a memory; and
one or more processors coupled to the interface and the memory, and configured to:
receive from a gateway device a first request to connect to a mobile network, the first request including an identifier of the gateway device and a default data service name, wherein the gateway device is configured to enable a mobile device to communicate with a cellular connectivity service of the mobile network;
responsive to detecting the default data service name, determine, from the identifier of the gateway device, a group to which the gateway device belongs along with a corresponding group identifier for the group;
query a repository with the corresponding group identifier for the group, and receive, in response, an assigned data service name that is associated with the corresponding group identifier for the group;
provide the assigned data service name to the gateway device; and
receive from the gateway device a second request to connect to the mobile network, the second request including the assigned data service name.

11. The device of claim 10, wherein the assigned data service name is one of an access point name (APN) or a data network name (DNN).

12. The device of claim 10, wherein the one or more processors are further configured to populate a directory of a plurality of data service names, wherein the assigned data service name is among the plurality of data service names.

13. The device of claim 12, wherein the one or more processors are further configured to enable manually populating the directory of the plurality of data service names.

14. The device of claim 12, wherein the one or more processors are further configured to populate the directory of the plurality of data service names based on information supplied by a service provider that operates the mobile network.

15. The device of claim 12, wherein the one or more processors are further configured to populate the directory of the plurality of data service names based on information automatically received as a result of creating a new service definition.

16. The device of claim 15, wherein the new service definition defines a network slice in a fifth generation (5G) wireless network.

17. A non-transitory computer readable storage media encoded with instructions that, when executed by a processor, cause the processor to:
receive from a gateway device a first request to connect to a mobile network, the first request including an identifier of the gateway device and a default data service name, wherein the gateway device is configured to enable a mobile device to communicate with a cellular connectivity service of the mobile network;
responsive to detecting the default data service name, determine, from the identifier of the gateway device, a group to which the gateway device belongs along with a corresponding group identifier for the group;
query a repository with the corresponding group identifier for the group, and receive, in response, an assigned data service name that is associated with the corresponding group identifier for the group;
provide the assigned data service name to the gateway device; and receive from the gateway device a second request to connect to the mobile network, the second request including the assigned data service name.

18. The non-transitory computer readable storage media of claim 17, wherein the assigned data service name is one of an access point name (APN) or a data network name (DNN).

19. The non-transitory computer readable storage media of claim 17, wherein the instructions cause the processor to populate a directory of a plurality of data service names, wherein the assigned data service name is among the plurality of data service names.

* * * * *